June 16, 1942. L. H. SCOTT 2,286,236
GEARING MECHANISM FOR EFFECTING SPEED CHANGES
Filed Oct. 1, 1940 2 Sheets-Sheet 1

INVENTOR
Lloyd H. Scott
BY
Watson, Bristol, Johnson Leavenworth
ATTORNEYS

June 16, 1942.  L. H. SCOTT  2,286,236
GEARING MECHANISM FOR EFFECTING SPEED CHANGES
Filed Oct. 1, 1940  2 Sheets-Sheet 2

INVENTOR
Lloyd H. Scott
BY Watson, Bristol, Johnson & Leavenworth
ATTORNEYS

Patented June 16, 1942

2,286,236

UNITED STATES PATENT OFFICE 2,286,236

GEARING MECHANISM FOR EFFECTING SPEED CHANGES

Lloyd Hoyt Scott, Garden City, N. Y., assignor to The Seymour Corporation of Delaware, Seymour, Conn., a corporation of Delaware Application October 1, 1940, Serial No. 359,196

10 Claims. (Cl. 123—149)

This invention relates to a gearing mechanism for transmitting driving torque with a desired speed change, and particularly to a coupling and speed changing gearing which incorporates a phase control or angular adjustment.

The invention has for its object generally the provision of a speed changing gearing of the character indicated which is simple and rugged, and is constructed in a manner adapted to provide substantially any desired angular relation, within certain limits, of driving to driven members, which are proportioned for accomplishing a desired speed change.

More specifically, the object is to provide a unitary device which may be employed to effect coupling between a driving member and a driven member proportioned to effect a change in speed in a desired ratio, through a third member which is arranged to effect the angular adjustment, or phase change, desired; such as may be used, for example, when coupling an internal combustion engine to a magneto.

Another object is to incorporate a phase change in a speed changing gearing of the character indicated, so that the driving and driven members may have a direct and positive phase adjustment whereby a desired advance and/or retardation of the relative angular positions of driving and driven members is had, and the adjustment readily held when made.

Still another object is to provide a construction for a casing for a gearing of the character indicated whereby the device may also serve to absorb vibration and to block the transmission thereof to the driven mechanism.

Other objects of the invention will in part be obvious and will in part appear hereinafter.

The invention accordingly, comprises the features of construction, combination of elements, and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which.

Figure 1:
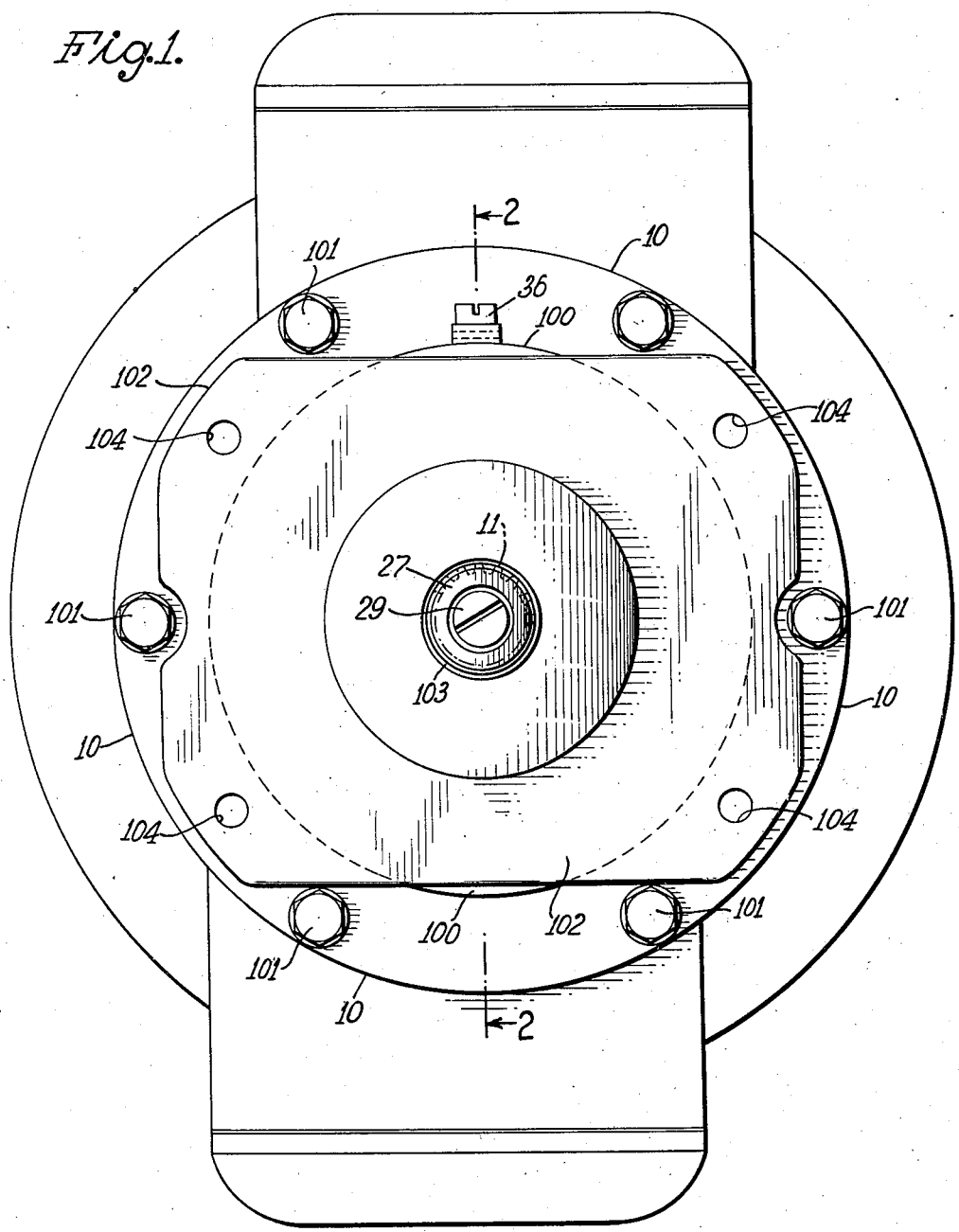
Fig. 1 is an elevational view of a housing for apparatus such as a magneto-electric machine, which is provided with a speed changing gearing in accordance with the present invention.
Figure 2:
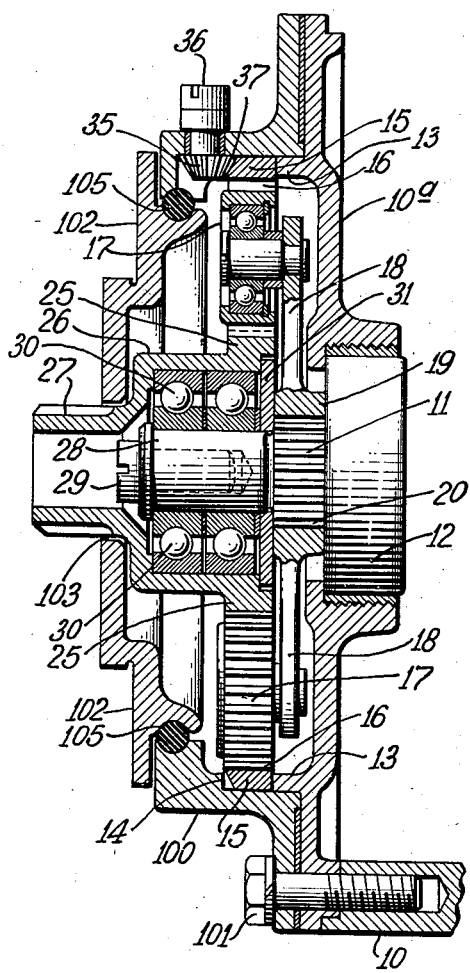
Fig. 2 is a sectional view taken on the line 2—2 in Fig. 1, showing the gearing mechanism partly in elevation and partly in section.

Referring now to the drawings, and particularly to Figs. 1 and 2, 10 denotes the wall of a casing or housing, such as may house a magneto. A rotating member or shaft 11 is journaled in the housing and provided with an end protruding through a bearing 12 that is mounted in end wall 10a (see Fig. 2) of the housing, such bearing including when desired an oil-seal. By such arrangement, the housing wall is substantially closed about the shaft 11, the protruding end being arranged to receive driving torque.

In the arrangement shown, housing 10 is advantageously formed with its end wall 10a made detachable and having an annular rib 13 for supporting and/or positioning thereon a shell or casing 100 which encloses a speed changing gearing of the invention. Here, the gearing is devised to effect the coupling of shaft 11 with another which transmits the driving force or torque, the coupling at the same time effecting a desired change in the rate of speed of driving shaft to driven shaft.

The speed change gearing here employed is of the planetary type and hence occupies relatively little space. Such gearing comprises essentially a driving member, a driven member, and a normally stationary member. In the present invention, this latter is made to be movable when a phase adjustment or certain other changes, as hereinafter explained, are desired to be effected.

The casing 100 may be secured in place on housing 10 by bolts 101 and preferably is provided with a closure 102 that is separable therefrom, as hereinafter more fully explained, and the casing 100 is arranged to support one member, which is normally stationary, of the speed change gearing. To this end, casing 100 is formed with an internal shoulder 14 that is spaced from the rib 13, providing thereby a groove (hereinafter referred to as groove 13—14) in which such stationary member, here comprising a ring gear 15, is disposed. Ring gear 15 is shown as provided with teeth 16 projecting inwardly and adapted to mesh with planetary gearing, such as the gear shown at 17, which is pivoted on a part or arm 18 of a driven member, that shown by way of example being a spider having a hub portion 19. This latter has a central bore formed with means, such as grooves, for slidingly engaging with a complementary shouldered portion 20 of shaft 11. In such arrangement, a plurality of planetary gears is preferred because of the balanced effects so achieved; the arrangement of Fig. 2 employing two or more planetary gears.

Each planetary gear 17 preferably has an annular shape with a large central bore in order to accommodate a ballbearing by which it is pivotally attached to an arm of the spider; ballbearings or other suitable antifriction bearings being preferably used in the device wherever bearings are required in the practice of the invention.

On the inside, the planetary gears 17 mesh with a driving member, here shown as a sun gear 25, comprising a toothed portion on a hub portion 26, together with a reduced coupling portion 27 which may be integral with the former and arranged to protrude through an opening 103 in the center of the closure 102. Coupling portion 27 is grooved or otherwise formed for mechanical coupling to a source of driving force (not shown in the drawing in the interests of clearness of illustration).

On the interior of casing 100 the hub portion 26 is elongated adjacent the gear portion 25, in order that it may be conveniently hollowed or bored out for the reception of one or more ball bearings 30 that mount the sun gear on a further reduced but extended end portion 28 of shaft 11. End portion 28 is, of course, cylindrical, and is provided with means at 29 for holding the bearings 30 in place on the end of the shaft; such means conveniently comprising a screw and washer accessible through an opening in the end of the coupling portion 27. An enlarged washer 31 is also advantageously slipped over the reduced end 28 against the shoulder adjoining the portion 20 of shaft 11. Washer 31 is preferably of a diameter such as to close entirely the internal bore of the hub portion 26, such bore being also advantageously counterbored or recessed in order that the washer 31 may close relatively tightly the bearing receiving bore and thus serving as means for retaining any lubricant introduced into the bore.

In order that the planetary gearing thus provided may have phase adjustment, in accordance with the invention, the ring gear 15 is mounted in such manner and provided with such means that angular movement thereof may be effected about the groove 13—14. Any suitable means may be employed which is positive in action and capable of holding an adjustment when made. An exemplary means is shown in Fig. 2, and here comprises a bevel gear 35 journaled in the casing 100 at a convenient point and formed with its axis of rotation at an angle to that of the ring gear; for example, one which is substantially at right angles to that of the ring gear 15. At least a portion of the side of the ring gear is provided with a complementary set of beveled gear teeth 37 for meshing with gear 35; the latter being conveniently formed with a protruding external portion 36 which may be kerfed or otherwise adapted for engagement with a motion transmitting shaft (not shown in the drawing in the interests of clearness of illustration).

The closure 102 is adapted to be secured to any suitable support, such as the frame or casing of an internal combustion engine, and to this end preferably has flanges that have openings 104 for the reception of securing bolts. When so secured, closure 102 serves as the mounting means for the magneto on the engine which provides the driving torque. The assembly thus provided on the engine frame or casing thus forms what might be regarded as a rigid structure, transmitting any vibration of the engine to the magneto through closure 102, unless suitable steps are taken for preventing this. To achieve such prevention, vibration absorbing means are interposed in the connection between casing 100 and closure 102. To this end, the joint between the casing 100 and closure 102 is effected by means of a resilient element or material which has a relatively great damping coefficient, for example, rubber. A continuous rubber member 105 is shown inserted in suitable retaining grooves formed respectively in casing 100 and in the closure 102. Such member, when in place, is also resistant to the passage of lubricant. The shape or cross-section of the rubber member may have any convenient form, for example, circular. When the casing and its closure are assembled with the rubber member in between, such member contributes to the angular rigidity of the assembly, while accommodating transverse vibrations. Also, it will be seen that the parts when assembled as shown may not be disassembled.

In operation, the change in speed from that of the driving member to that of the driven member, i. e., from that of portion 27 to that of shaft 11, is determined by the ratio of the radius of the sun gear 25 to the sum of the radii of sun gear 25 and of ring gear 15, respectively. Since casing 100 may be made in one or more standard sizes and may thus be adapted to house planetary gearing, giving speed changes in different ratios, various sized casings with their assembled gearing may be employed to effect various speed changes in the transmission of driving torque from a driving member to a driven member. Such means, it is seen, may be used to effect a speed change in the drive of a magneto from engines of different speeds.

To change the phase, for example, to advance or retard the spark when a magneto is driven, the gear 35 is turned and the ring gear 15 made to travel a desired distance arcuately in the groove 13—14. In this way, a different time-relation in the phase of the spark to the revolution of the engine shaft is achieved. It is seen that the arrangement is such that, when a phase adjustment is made by moving ring gear 15, the position thereof is readily held.

Figure 3:
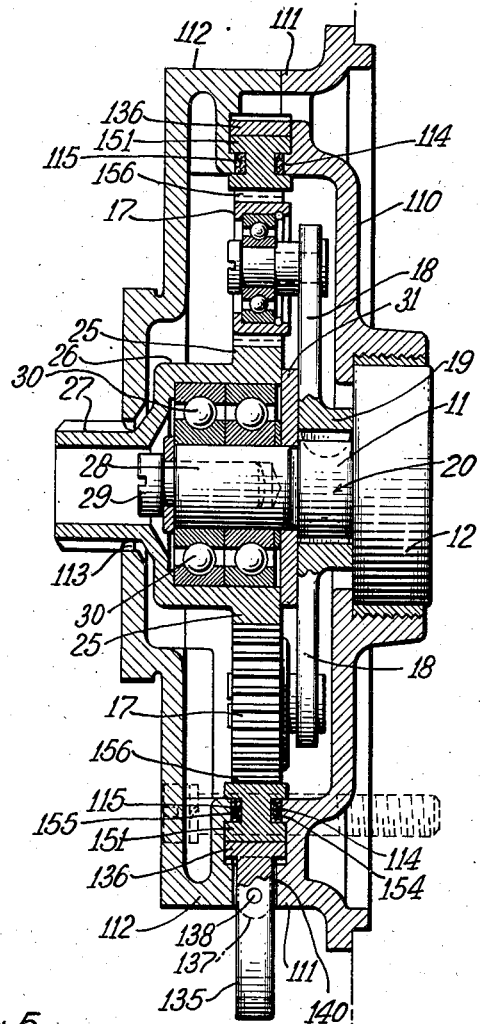
Fig. 3 is a view similar to Fig. 2, showing a modified form of speed changing gearing.

In the modification shown in Fig. 3, a modified casing end 110 is shown which has a wide rib 111 that is arranged to support a detachable cover or casing 112; the latter being formed with an opening 113 through which protrudes a shank 27 of a sun gear 25 that extends to the exterior of the casing. In this form, the portion 20 of shaft 11, as in the first modification, is engaged by a hub portion 19 of a spider whose part or arms 18 carry planetary gearing, such as at 17, which engages with a ring gear 151. This latter is supported as in the first modification, i. e., in a peripheral groove in the casing 110; the groove being here arranged to be opened when the casing 112 is removed.

Such groove in the second modification is formed by cutting similar annular recesses in the adjoining faces at 111 of casings 110 and 112, each recess being formed by cutting back the face at the inner periphery for a desired distance, so that there is provided an arcuate clearance with spaced but opposite shoulders 114 and 115. The faces are preferably further recessed at a radial distance a little further out on the radii of the casings so that the shoulders 114 and 115 overhang to a desided extent.

The ring gear 151, in order to work in a desired manner in such groove, is also annularly grooved or recessed in its sides, i. e., a side groove is also preferably formed in each side wall which has a width such as to span the shoulders 114 and 115 by a working fit. There is also preferably interposed in each of these oppositely formed side grooves a liner or packing member, such as shown respectively at 154 and 155. The interior teeth of the ring gear which engage with the planetary gear or gears are shown at 156.

Figure 4:
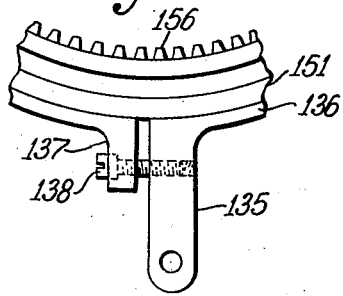
Figs. 4 and 5 are fragmentary views showing details.
Figure 5:
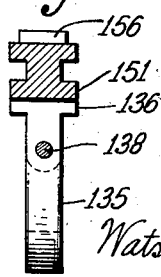

In order that the ring gear here shown may be arcuately adjusted when desired, it is provided with a lever arm 135 that is formed as a radial extension on a friction band or ring 136, as clearly shown in Figs. 4 and 5. The other end of band 136 has a radially projecting lug 137 that is disposed adjacent the lever arm 135 and secured thereto by means of a screw 138 which has threaded engagement with lever arm 135 only. Motion transmitted through lever arm 135 to the ring gear thus causes it to travel in an arcuate slot 140 formed as a continuation of the groove 114—115 to the outside of the casing and extending preferably but a limited distance about the periphery of the casing 112. Lever arm 135 may have any suitable form, for example, that of a radial member which has its inner end attached to the band 136, which, when tightened, engages the outside surface of the ring gear 151 and may move the same. The lever arm 135 is formed, for example, perforated, at the outer end, for attachment to suitable actuating means, such as a rod or linkage (not shown in the drawing in the interests of clearness of illustration).

In operation, the second modification operates to effect a change of desired ratio in the speeds at which the driving shaft and driven shaft run, in the same manner as in the modification shown in Fig. 2. When it is desired to effect a phase adjustment, motion is transmitted to the lever arm 135 in order to impart to it arcuate movement in the slot 140. This travel is seen to effect a phase adjustment substantially in the same manner as in the first-described modification, the arrangement being such that the adjustment is readily held when made.

It will be seen that, by the present invention, the angular adjustment here arbitrarily imparted to the ring gear member in the casing 100 permits angular adjustment of the driving member 27 with respect to the magneto shaft 11, whereby the desired initial timing adjustment may be effected after mounting the magneto and associated speed change mechanism on the engine. This is seen to eliminate many initial trial adjustments heretofore practiced when timing the magneto to the engine. This permits dispensing with the adjustment slots commonly called for in magneto specifications in the mounting flanges. The present invention is accordingly seen to economize in the time required for magneto installation and adjustment.

By means of the present invention, it is also seen that the magneto may be quickly mounted on the engine without regard to any tooth or spline engagement and permanently fastened. The magneto may be brought into perfect timing with the engine by rotating the ring gear to the proper position and then clamping the advance and retard mechanism. This eliminates any need for trial mounting, harness flexibility, arcuate mounting flange slots and excessive engine clearance.

Also it will be seen that the present invention is readily adapted for use in connection with automatic devices for effecting advance or retardation of the spark from a magneto, since the operating connection from such device, whether transmitting motion of rotation or translation, may be coupled mechanically to the phase adjustment of the ring gear of the present speed changing device.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a speed change gearing, the combination with a rotatable member provided with a sun gear, of a spider provided with a planetary gearing in operative association with said sun gear, a second rotatable member in engagement with said spider, a third member normally stationary and provided with a ring gear in orbital association with said planetary gearing, said gearing when operatively assembled having radii proportioned to effect a desired speed change, a casing for supporting said gear assembly and provided with a groove in which said ring gear member may be moved arcuately, said casing having a peripherally grooved opening and a complementary grooved closure portion perforated to pass said first-named rotatable member, and a vibration absorbing member disposed in said grooves and forming a joint which holds the parts rigidly in desired angular adjustment.

2. A combined magneto driving, mounting and timing device comprising a casing adapted on one side to be mounted in a fixed position on an internal combustion engine and on the opposite side to serve as a mounting for a magneto in a fixed position, planetary gearing including a normally stationary ring gear and journalled within said casing adapted to receive driving power from a rotatable shaft forming a part of said engine and to transmit such power at a predetermined speed ratio to the magneto rotor shaft, and adjusting means extending through said casing whereby any desired arcuate adjustment of said ring gear may be accomplished.

3. Magneto mounting means comprising, in combination, a member to be relatively fixed, a complementary member on a magneto unit, cooperating faces on said members of such dimension as to be spaced apart when mounted in telescoping relation, said faces being provided with complementary grooves and compressed vibration absorbing means of resilient material seated in the grooves to form a supporting joint.

4. Magneto mounting means comprising, in combination, a member to be relatively fixed, a complementary member on a magneto unit, cooperating circumambient faces on said members of such dimension as to be spaced apart when mounted in telescoping relation, said faces being provided with complementary grooves, and vibration absorbing means of compressed resilient material seated in the grooves to form a supporting joint.

5. Magneto mounting means comprising, in combination a member to be relatively fixed, a complementary member on a magneto unit, cooperating cylindroidal faces on said members of such dimension as to be spaced radially apart when mounted in telescoping relation, said faces being provided with complementary grooves, and a vibration absorbing ring of compressed resilient material seated in the grooves to form a supporting joint.

6. Magneto mounting means comprising, in combination, a mounting plate adapted to be fixedly mounted on a vibrating structure and having an aperture for traverse by a driven member, an annular extending flange on one face of said plate about the aperture, a complementary member on a magneto unit, an annular flange extending from said member adapted for telescoping cooperation with said plate flange and of such dimension as to be spaced radially therefrom when mounted in overlapping relation therewith, said flanges being provided with complementary grooves, and a vibration absorbing ring of resilient material firmly seated in the grooves to form a supporting joint.

7. A demountable and readily replaceable speed change gearing unit, comprising a casing enclosing speed change gearing having an aperture in one side thereof for traverse by a driven member and an aperture in the opposite side thereof for traverse by a driving member adapted to rotate the magneto rotor and means demountably to mount the driving side of said casing to a magneto unit.

8. A demountable and readily replaceable speed change gearing unit, comprising a casing enclosing speed change gearing and having an aperture in one side thereof for traverse by a driven member and an aperture in the opposite side thereof for traverse by a driving member adapted to rotate the magneto rotor, means demountably to mount the driven side of said casing to supporting structure, and means demountably to mount the driving side of said casing to a magneto unit.

9. A demountable and readily replaceable speed change gearing unit, comprising, in combination, a casing enclosing speed change gearing comprising a driven sun gear, an adjustable normally stationary ring gear and a rotatable member having planetary gearing in operative engagement with said sun gear and ring gear, said rotatable member adapted to be coupled to a magneto rotor through an aperture in one side of said casing, the opposite side of said casing having an aperture for traverse by a driven member for driving said sun gear, means demountably to mount the driving side of said casing to a magneto unit with said rotatable member coupled to the rotor thereof and means extending through said casing adapted for adjustable rotation of said ring gear to desired stationary positions.

10. A demountable and readily replaceable speed change gearing unit, comprising, in combination, a casing enclosing speed change gearing comprising a driven sun gear, an adjustable ring gear and a rotatable member having planetary gearing in operative engagement with said sun gear and ring gear, said rotatable member adapted to be coupled to a magneto rotor through an aperture in one side of said casing, the opposite side of said casing having an aperture for traverse by a driven member for driving said sun gear, means demountable to mount the driving side of said casing to a magneto unit with said rotatable member coupled to the rotor thereof and means extending through said casing adapted for adjustable rotation of said ring gear, said casing having a mounting plate providing the driven side thereof with said plate having a circumambient transversely extending flange cooperating with a complementary flange on the main body of said casing with said flanges provided with complementary grooves and in which is firmly seated a vibration absorbing ring of resilient material.

LLOYD HOYT SCOTT.